(12) United States Patent
Gruhler

(10) Patent No.: US 8,201,456 B2
(45) Date of Patent: Jun. 19, 2012

(54) MEASURING CELL AND A METHOD OF USE THEREFOR

(75) Inventor: Holger Gruhler, Tuningen (DE)

(73) Assignee: Vega Grieshaber KG, Wolfach (DE)

( * ) Notice: Subject to any disclaimer, the term of this patent is extended or adjusted under 35 U.S.C. 154(b) by 17 days.

(21) Appl. No.: 12/859,005

(22) Filed: Aug. 18, 2010

(65) Prior Publication Data
US 2011/0100129 A1    May 5, 2011

(30) Foreign Application Priority Data
Nov. 2, 2009    (DE) .......................... 10 2009 051 611

(51) Int. Cl.
*G01L 9/12*    (2006.01)
*G01L 9/02*    (2006.01)
(52) U.S. Cl. ........................................... 73/718; 73/724
(58) Field of Classification Search ............. 73/700–756
See application file for complete search history.

(56) References Cited

U.S. PATENT DOCUMENTS

| | | | |
|---|---|---|---|
| 4,177,680 A * | 12/1979 | Coleman | 73/718 |
| 5,836,063 A * | 11/1998 | Hegner et al. | 29/25.42 |
| 2002/0124654 A1* | 9/2002 | Jacob et al. | 73/708 |
| 2004/0237658 A1* | 12/2004 | Ohms et al. | 73/718 |
| 2008/0110269 A1* | 5/2008 | Strietzel et al. | 73/718 |
| 2009/0293627 A1* | 12/2009 | Tham et al. | 73/721 |
| 2010/0186516 A1* | 7/2010 | Hanselmann et al. | 73/718 |
| 2010/0281992 A1* | 11/2010 | Dannhauer et al. | 73/716 |
| 2011/0100130 A1* | 5/2011 | Gruhler | 73/708 |

FOREIGN PATENT DOCUMENTS

| | | |
|---|---|---|
| DE | 2021 479 | 5/1970 |
| DE | 24 61 424 | 7/1976 |
| DE | 41 33 009 C2 | 1/1996 |
| DE | 693 06 575 T2 | 4/1997 |
| EP | 1 186 875 B1 | 3/2002 |

OTHER PUBLICATIONS

German Office Action for Ser. No. DE 10 2009 051 611.5 filed Nov. 2, 2009, 3 pages, mailed Nov. 2, 2009; 3 pages—English translation.

* cited by examiner

*Primary Examiner* — Andre Allen
(74) *Attorney, Agent, or Firm* — Andrew F. Young, Esq.; Lackenbach Siegel, LLP

(57) ABSTRACT

The present invention is a measuring cell comprising a base body. Layered upon the base body is a measurement membrane having a first measuring element, a measurement device, and an intermediate membrane. The intermediate membrane is arranged between the measurement membrane and the base body, and a second measuring element is arranged thereon. When a pressure force is applied to the cell, the measurement membrane is directed outward and undergoes deformation with respect to the intermediate membrane as well as the base body. The deformation causes the measuring capacitance formed by the measuring electrodes to change according to the pressure applied.

20 Claims, 5 Drawing Sheets

MEASURING CELL AND A METHOD OF USE THEREFOR

CROSS REFERENCE TO RELATED APPLICATIONS

This application claims priority from German Patent Application Ser. No. 10 2009 051 611.5, filed Nov. 2, 2009, the entire contents of which is herein incorporated fully by reference. Additionally, this application is related to German Patent Application Ser. No. 10 2009 051 613.1, filed Nov. 2, 2009 and filed subsequently in the United States as U.S. patent application Ser. No. 12/859.061 filed Aug. 18, 2010, the entire contents of each of which is herein incorporated fully by reference.

FIGURE FOR PUBLICATION

FIG. 1.

BACKGROUND OF THE INVENTION

1. Field of the Invention

The present invention relates to a measuring cell. More specifically, the present invention relates to a measuring cell with a base body, a measurement membrane arranged on the base body, and a measurement device, with a first measuring element and a second measuring element, and wherein the first measuring element is arranged on the measurement membrane.

2. Description of the Related Art

The related art involves pressure measuring cells. Such measuring cells are known in the state of the art, for example, as pressure measuring cells for the capacitive detection of a pressure applied externally to the measuring cell. Such a capacitive pressure measuring cell presents a base body, and a measurement membrane arranged on the base body, where, on facing surfaces of the measurement membrane and of the base body, laminar electrodes are arranged to form a capacitance. When pressure is applied to the measurement membrane, the separation between the measurement membrane and the base body changes, and thus the capacitance of the capacitor formed by the measuring electrodes changes, so that it becomes possible to detect an applied pressure.

In measuring cells constructed according to this principle, it is problematic that, due to rapid temperature changes, so-called thermal shocks, for example, a pressure jump from 20° C. to 80° C., and because of a relatively slow temperature equalization within the measuring cell, structure-mechanical deformations of the measuring cell occur, which, due to the resulting bending of the measurement membrane, produce a change in the measured value, although no pressure change has occurred. If the temperature changes are slow, the temperatures equalize due to heat conduction via a glass solder connection between the measurement membrane and the base body, so that no deformations of the measuring cell and particularly of the measurement membrane are caused. However, in case of rapid temperature changes, such as those that occur, for example, during thermal shock, the temperature equalization between the measurement membrane and the base body occurs only after the longer time, so that, due to the temperature gradient, the membrane undergoes a deformation with respect to the base body, the capacitance conditions inside the cell change, and a pressure change is simulated.

By compensating for such erroneous measurements, it is known, in the state of the art, for example, EP 1 186 875 B1, to arrange a temperature sensor for the acquisition of temperature changes in a glass solder connection, by means of which the measurement membrane is arranged on the base body. This temperature allows distinguishing between temperature changes with a steep temperature gradient and actual pressure changes, and compensating the issued values with the help of electronic processing.

According to the prior art, compensation can be achieved by use of a bending line of the measurement membrane and the resulting changed capacitance value to detect the occurrence of a thermal shock and to correct the incorrect measured value.

What is not appreciated by the prior art is that the presence of a thermal shock can only be detected from incorrect measured values, and consequently a very rapid signal processing of the measured values is needed. Another problem is that it is not possible to reliably detect temporally overlapping events, such as, for example, the overlap between a pressure pulse and a thermal shock, and process it.

Accordingly, there is a need for an improved measuring cell, such that the effects of a thermal shock and the resulting measurement errors are reduced.

ASPECTS AND SUMMARY OF THE INVENTION

An aspect of the present invention is to provide an improved measuring cell, such that the effects of a thermal shock and the resulting measurement errors are reduced.

Another object of the present invention is to provide a means to reliably detect temporally overlapping events, such as, for example, the overlap between a pressure pulse and a thermal shock, and to process the resulting data.

According to an embodiment of the present invention there is provided a measuring cell having a base body, a measurement membrane which is arranged on the base body, and a measurement device with a first measuring element and a second measuring element, where the first measuring element is arranged on the measurement membrane, and an intermediate membrane is provided, which is arranged between the measurement membrane and the base body, and on which the second measuring element is arranged.

A measuring cell which is designed in this way, and which can be used, for example, as a pressure measuring cell, allows compensation of the thermal shock by purely structure-mechanical means, by providing, between the measurement membrane and the base body, an additional intermediate membrane on which the second measuring element is arranged. A pressure applied on the measurement membrane remains without significance for the intermediate membrane, however, a thermal shock acting on the measurement membrane is transmitted very rapidly, because of the intermediate membrane presenting a smaller thickness compared to the base body, so that the two membranes, due to their similar heat capacity, undergo a deformation of identical type and size, due to the thermal shock. Effects on a slot separation, which operatively determines the size of the capacitance in the case of a capacitance measuring cell, and thus the measured pressure values delivered, can thus be compensated in a structure-mechanical manner.

A temperature change acting from the exterior of the measurement membrane in the case of a thermal shock, is transmitted substantially more rapidly to the intermediate membrane arranged between the base body and the measurement membrane, so that the intermediate membrane undergoes a similar deformation to that of the measurement membrane, resulting in both the first and also the second measuring element undergoing precisely this change that is directed in the same direction, so that a change in measured value caused by a thermal shock can be avoided or strongly suppressed.

To design the measuring cell as a capacitive measuring cell, the measuring elements can be designed as measuring electrodes. A measuring capacitance formed by the measuring electrodes thus undergoes only slight changes in case of a thermal shock, because both the membrane and also the intermediate membranes expand approximately identically, and thus a change in the slot separation between the membrane can be avoided.

For the formation of as large as possible a capacitance, the measuring electrodes can be designed as flat metallizations of identical size, where the measuring electrodes are centered on the measurement membrane and the intermediate membrane, and present a radius which is between 80% and 95% of a radius of the measurement membrane.

A thickness of the measuring electrodes or a thickness of the metallizations for the measuring electrodes is preferably in the range of a few μm.

In addition to the measuring electrodes, ring-shaped reference electrodes can also be provided, which enclose the measuring electrodes. Due to an arrangement of the reference electrodes in the area of a solder ring by means of which the measurement membrane and the intermediate membrane are attached at their margin peripherally on the base body, one ensures, in the case of both pressure changes and temperature changes, that there is only a slight change in the capacitance of a reference capacitance formed by the reference electrodes, which allows a normalization of a capacitance value determined by means of the measuring electrodes.

For the separate detection of a thermal shock, it is advantageous if on mutually facing surfaces of the intermediate membrane and the base body, additional measurement elements, for example, measuring electrodes, are provided so that, by means of the additional measuring elements, a deformation or shift of the intermediate membrane relative to the base body can be determined. As a result, it is possible additionally to detect a thermal shock and carry out an additional compensation of the thermal shock.

For the adaptation of the heat capacity of the intermediate membrane and to make the intermediate membrane become insensitive to pressure changes in the interior of the measuring cell, it can be advantageous to design the intermediate membrane with depressions or recesses in the form of perforations.

A positive influence on the thermal shock effects is achieved if a thickness of the intermediate membrane is between 100% and 150% of a thickness of the measurement membrane.

Due to variation of the solder ring width between 2 mm and 5 mm, an additional influence on heat transport or the bending of the membranes can be achieved.

By varying the thickness of the soldering ring between 10 and 20 μm, one can additionally achieve that the size of the measurement capacitance and of the reference capacitance is set optimally for detection, so that, as a result, the consequences of measurement errors are reduced.

An additional possibility to reduce the effects from a thermal shock consists in that a clearance between the measurement membrane and the base body is filled with a fluid which presents an elevated heat conductivity compared to air, for example, helium, hydrogen, water or glycerol. In particular, if the fluid is a liquid which is by nature incompressible, it is advantageous if a pressure compensation arrangement, for example, in the faun of a pressure compensation membrane connected via a duct, an error-affected pressure compensation container, or a volume-variable pressure compensation container is provided, in order to ensure uniform pressure conditions within the measuring cell.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1A:
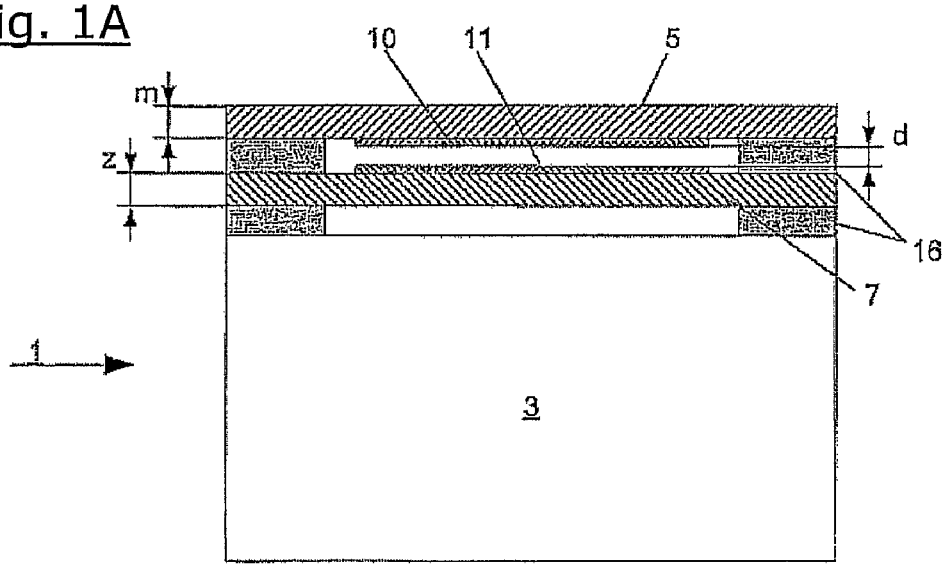
FIG. 1A shows a first embodiment example of a cell, according to the invention, with an intermediate membrane.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figure 2:
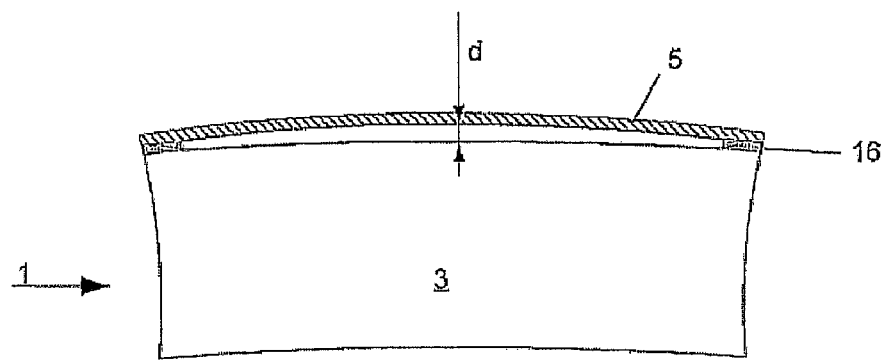
FIG. 2 is a vertically exaggerated representation of the effects of a thermal shock on a conventional measuring cell.

FIG. 2 shows a vertically exaggerated representation of the effects of a thermal shock on a measuring cell 1 as known from the state of the art. The measuring cell 1 is represented in a simplified way in FIG. 2, and it is constructed from a base body 3 with a measurement membrane 5 which is connected via a solder ring 16 to the base body 3. As a result of the thermal shock, for example, a temperature jump from 20° C. to 80° C. in less than one second, a voltage is introduced into the measuring cell 1 due to the different temperatures of the measurement membrane 5 and the base body 3, so that the measurement membrane 5, as represented, arches upward, and thus a slot separation d between the measurement membrane 5 and a top side of the base body 3, which faces the measurement membrane 5, is increased. Such a temperature shock changes a value of a measuring capacitance $C_M$, which is formed by measuring electrodes 10, 11 which are not shown in this representation, by the change of the slot separation d, so that a pressure drop is detected, although there is no external pressure change. In this manner, measurement errors are generated, which can be acquired and compensated only by expensive compensation devices, for example, by means of temperature sensors.

FIG. 1A shows a pressure measuring cell 1 according to the invention, which is constructed from a base body 3, on which, via solder rings 16, an intermediate membrane 7 and a measurement membrane 5 are arranged in a sandwich like design. When the pressure measuring cell 1 is used, the measurement membrane 5 is directed outward and undergoes deformation, when exposed to pressure, with respect to the intermediate membrane 7 as well as the base body 3, so that the measuring capacitance $C_M$, which is formed by measuring electrodes 10, 11 arranged on the measurement membrane 5 as well as on the intermediate membrane 7, is changed in accordance to the pressure applied. In this way, the pressure acting from the exterior can be detected, and its magnitude can be determined. A pressure applied on the measurement membrane 5 remains without consequence for the intermediate membrane 7, which can be formed advantageously with perforations, so that a change of the slot separation d between the measurement membrane 5 and the intermediate membrane 7, and the resulting capacitance change, is representative for the applied pressure.

Temperature changes which are applied from the exterior to the measurement membrane 5 are transmitted substantially more rapidly to the intermediate membrane 7, because of its heat capacity which is substantially lower than that of the base body 3, so that, due to the effect of heat, the measurement membrane 5 and the intermediate membrane 7 undergo a deformation of identical size and identically rapidity compared to the base body 3, which results in the slot distance d between the measuring electrodes 10, 11 remaining substantially constant.

Due to an appropriate adaptation of the heat capacity of the intermediate membrane 7, that is by an appropriate choice of a thickness z of the intermediate membrane 7 in relation to a thickness m of the measurement membrane 5, as well as by appropriate dimensioning of the slot separation d, the sensitivity of the pressure measuring cell 1 to a thermal shock can be further reduced. In the case of a pressure measuring cell 1 with a membrane diameter of approximately 28 μm, it was observed that very good compensation results are achieved if the thickness z of the intermediate membrane 7 is 650 μm, which is approximately 1.5 times the thickness m of the measurement membrane 5. The optimal thickness z of the intermediate membrane is a function of the dimensions of the solder ring. The chosen slot separation d, in such a measuring cell, is approximately 16 μm, so that a measuring capacitance of approximately 50 pF can be achieved by appropriately large dimensioning of the measuring electrodes 10, 11.

Figure 1B:
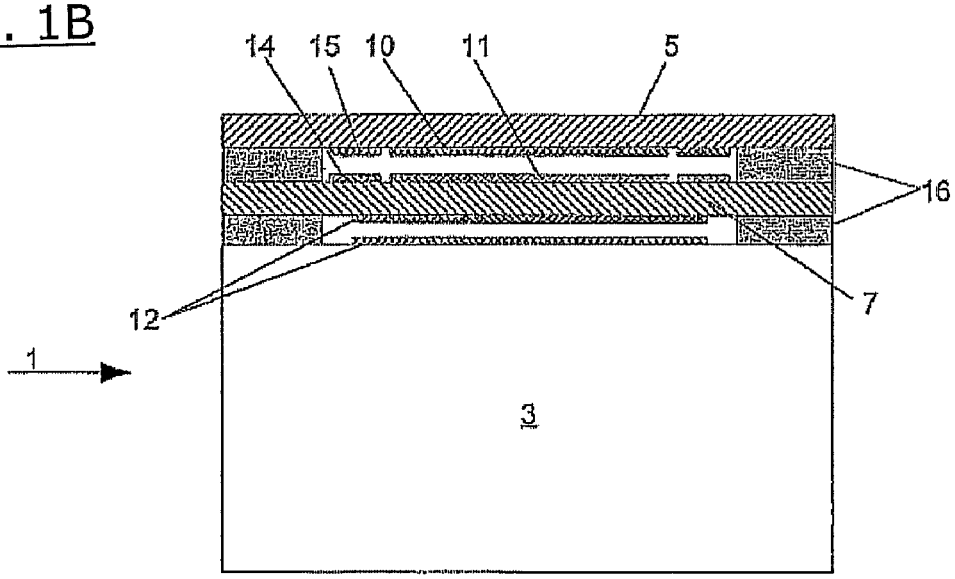
FIG. 1B shows a second embodiment example of a measuring cell, according to the invention, with intermediate membrane.

FIG. 1B shows a variant of the pressure measuring cell from FIG. 1A, where, on the one hand, between the measurement membrane 5 and the intermediate membrane 7, ring-shaped reference electrodes 14, 15 are arranged around the measuring electrodes 10, 11, and, on the other hand, between the base body 3 and the intermediate membrane 7, additional measuring electrodes 12 are provided. As a result of the reference electrodes 14 arranged in the marginal area within the solder ring 16, an additional reference capacitance $C_R$ is formed, whose value changes only slightly in the case of both the effect of pressure and the effect of temperature, due to the position of the solder ring 16. By means of the reference capacitance $C_R$, it is possible to normalize a value of the measuring capacitance $C_M$ determined by means of the measuring electrodes 10, 11, so that a dimensionless measured value M is obtained.

Due to the additional electrodes 12 arranged between the intermediate membrane 7 and the base body 3, a capacitance is formed, for the detection of a thermal shock, referred to below as the thermo-capacitance $C_T$. Although a pressure on the measurement membrane 5 remains without consequence for the intermediate membrane 7, while, however, a temperature effect is determined by the intermediate membrane 7 approximately identically to the measurement membrane 5, a thermal shock can be detected by the thermo-capacitance $C_T$, and thus taken into account in addition for the compensation by the intermediate membrane 7 and also in the further processing, for example, by means of an additional compensation. In this manner, the measured values M obtained from a measuring cell 1 designed according to the invention can be optimized further.

Figure 3:
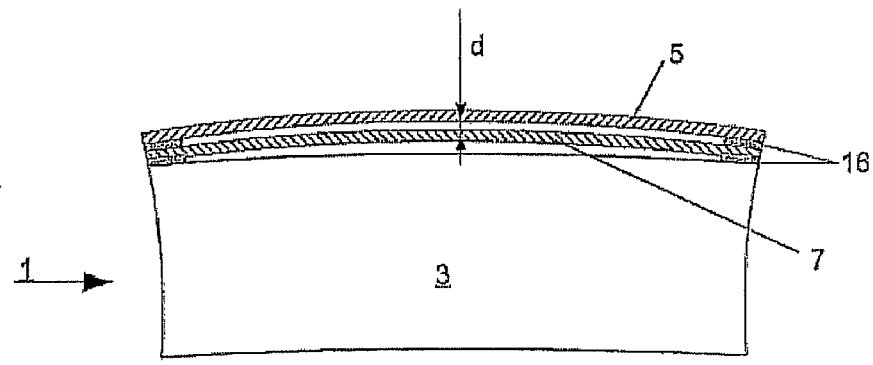
FIG. 3 is a vertically exaggerated representation of the effects of a thermal shock on a measuring cell according to the invention.

In comparison to FIG. 2, which has already been described above, FIG. 3 shows the consequences of a thermal shock on a pressure measuring cell 1 designed according to the invention. As can be seen from the representation in FIG. 3 in connection with the diagram from FIG. 6, the slot separation d between the measurement membrane 5 and the intermediate membrane 7 undergoes only insubstantial change in the case of an optimal selection of the thickness z of the intermediate membrane 7 in relation to the thickness m of the measurement membrane 5, so that, as shown in FIG. 7, at the time of a maximum effect of the thermal shock, an improvement of the value of the measuring capacitance $C_M$ by up to 80% is achieved. Moreover, as one can also see in FIG. 7, the value of the reference capacitance $C_R$ is also influenced less in the case of a measuring cell 1 according to the invention with intermediate membrane 7, so that, in total, as one can see in FIG. 9, an improvement of the measured value M by up to 83% can be achieved.

Figure 4:
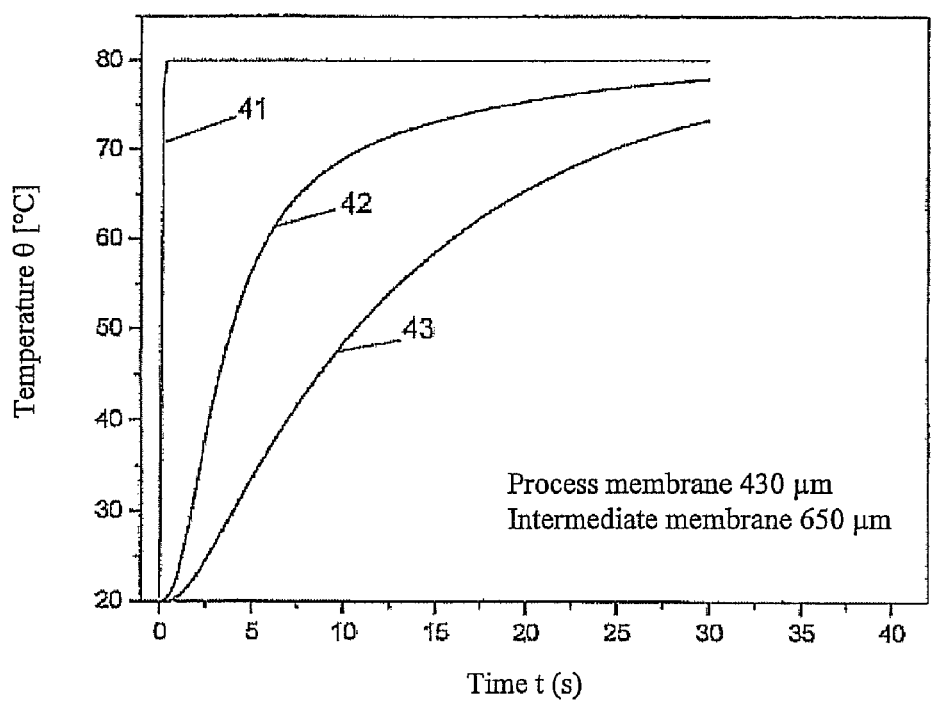
FIG. 4 is a diagram of the temperature plots of the measurement membrane, of the intermediate membrane as well as of the base body, for a thermal shock from 20° C. to 80° C.

In FIG. 4, the change in the temperature θ is shown—for the case of a thermal shock from 20° C. to 80° C. in the center of the measuring cell 1—in the characteristic line 41 for the measurement membrane 5, in the characteristic line 42 for the intermediate membrane 7, and in the characteristic line 43 for the base body 3. The measuring cell 1 used for this evaluation was constructed with a measurement membrane 5 having a thickness m=430 μm and an intermediate membrane 7 having a thickness z=650 μm. As one can see from the characteristic line 41 in FIG. 4, the measurement membrane 5 determines a temperature jump from 20° C. to 80° C. in approximately one second, and then remains at a constant temperature of 80° C. In comparison to the relatively slow temperature determination of the base body 3 (see the characteristic line 43), the intermediate membrane 7 reaches a temperature θ of 70° C. already after approximately 11 seconds, where, on the other hand, the base body 3 reaches this temperature θ only after a time t of approximately 25 seconds. As a result of this substantially more rapid temperature increase as well as due to the transfer of mechanical stresses from the measurement membrane 5 to the intermediate membrane 7, the intermediate membrane 7 is deflected upwards approximately identically to the measurement membrane 5.

Figure 5:
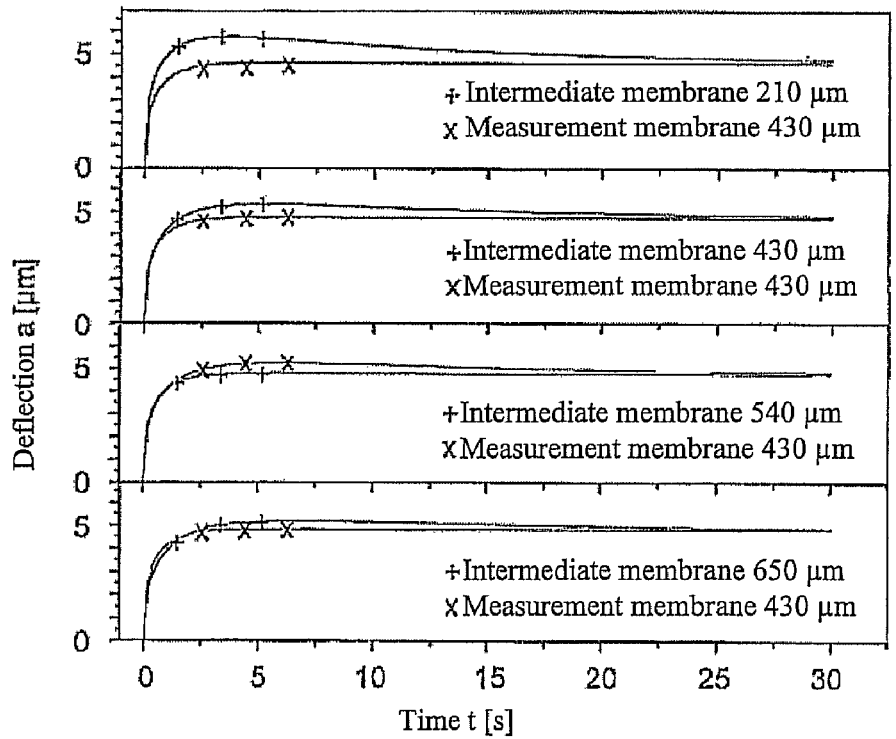
FIG. 5 is a comparison diagram of the deflection of different measurement membranes and intermediate membranes.

FIG. 5 shows a comparison of 4 measuring cells which in each case present a measurement membrane having a thickness m=430 μm and intermediate membranes with thicknesses z in the range of 210-650 µm. In the diagrams of FIG. 5, the deflection a of the membranes 5, 7 out of a rest position $a_0$ is shown in the case of the effect of a temperature shock over the time t. It is shown how, in each case, the intermediate membrane 7 is deflected upwards in comparison to the measurement membrane 5, out of its rest position $a_0$, in the case of exposure to the effect a temperature shock. As one can see in FIG. 5, the best results were achieved with an intermediate membrane 7 having the thickness z=650 µm.

Figure 6:
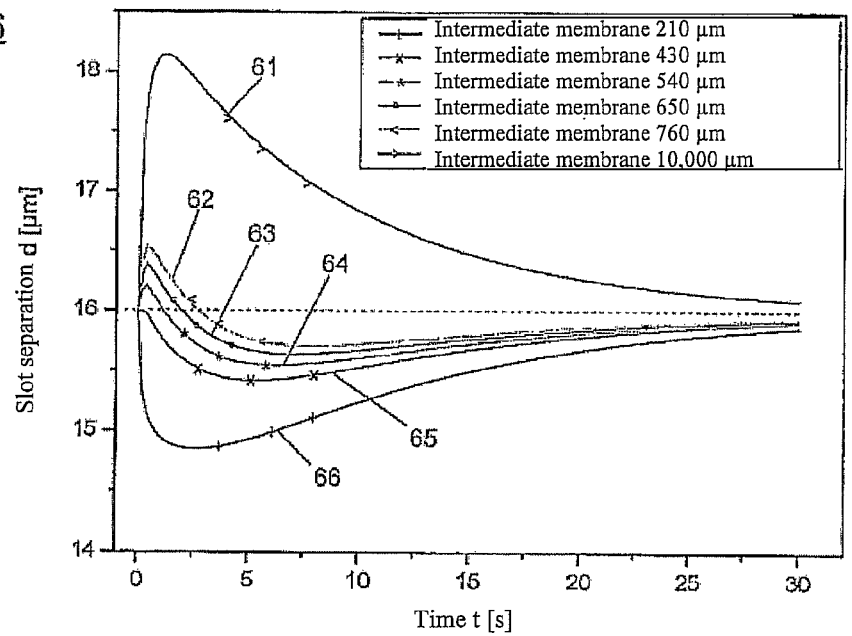
FIG. 6 is a comparison diagram of the temporal development of the maximum slot separation with different intermediate membranes.
Figure 7:
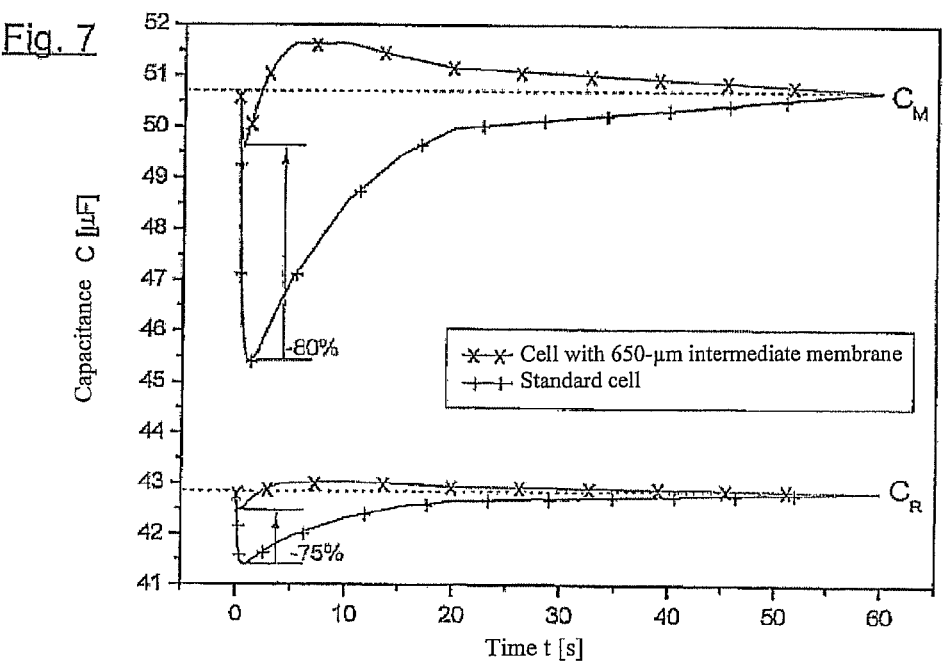
FIG. 7 is a comparison diagram of the development of the measuring capacitance and of the reference capacitance of a measuring cell according to the state of the art, and a measuring cell according to the invention.

In FIG. 6, the slot separation d, which is obtained from the difference of the deflections a of the measurement membrane 5 and of the intermediate membrane 7, is in the same time scale as represented in FIG. 5, and thus allows a comparison of intermediate membranes presenting different thicknesses z. To allow a comparison with measuring cells 1 as known from the state of the art, in addition to the intermediate membrane thicknesses z compared in FIG. 5, a measuring cell with an intermediate membrane having a thickness z of 10,000 µm is represented, which in its behavior corresponds to the base body 3 of the cell 1, due to the large thickness z as well as the large heat capacity. In the case of a measuring cell 1 according to the state of the art, the slot separation d changes, as represented in the characteristic line 61 of FIG. 6, in case of exposure to a thermal shock, from approximately 16 to more than 18 µm, which results in a variation—represented in FIG. 7—of the measuring capacitance $C_M$ from 50.6 pF to approximately 45.5 pF. The maximum capacitance variation in the case of a standard measuring cell is thus approximately −5.3 pF, i.e., more than 10% of the actually measured capacitance value. These variations can be reduced with an intermediate membrane 7 having a thickness z of approximately z=650 µm, as illustrated in the characteristic line 63 in FIG. 6, to approximately ±0.4 µm and thus to a maximum capacitance variation of ±1 pF.

In FIG. 7, the variation of the reference capacitance $C_R$ of a measuring cell 1 according to the state of the art as well as a measuring cell 1 with an intermediate membrane 7 having a thickness z=650 µm is represented. As one can see in FIG. 7, for the reference capacitance $C_R$, the variations are also reduced considerably by an intermediate membrane 7.

Figure 8:
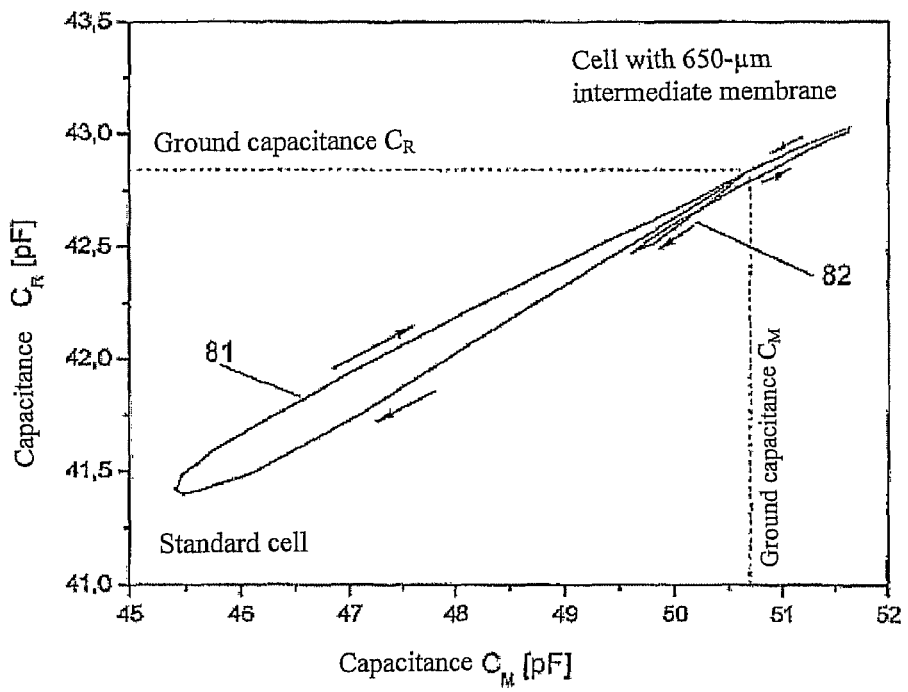
FIG. 8 is a comparison diagram of the change of the measuring capacitance and of the reference capacitance with a measuring cell according to the state of the art and a measuring cell according to the invention.

In FIG. 8, the changes in the measuring capacitance $C_M$ as well as the reference capacitance $C_R$ are plotted with respect to each other. From the characteristic line 81 according to the state of the art as well as from the characteristic line 82 for a measuring cell 1 according to the invention, it is apparent that a change of the measured value M, which [sic] from the ratio of the measuring capacitance $C_M$ to the reference capacitance $C_R$ for the measuring cell 1 according to the invention with a 650 µm compensation membrane, varies in a substantially smaller range, and presents better linearity in comparison to a standard cell.

Figure 9:
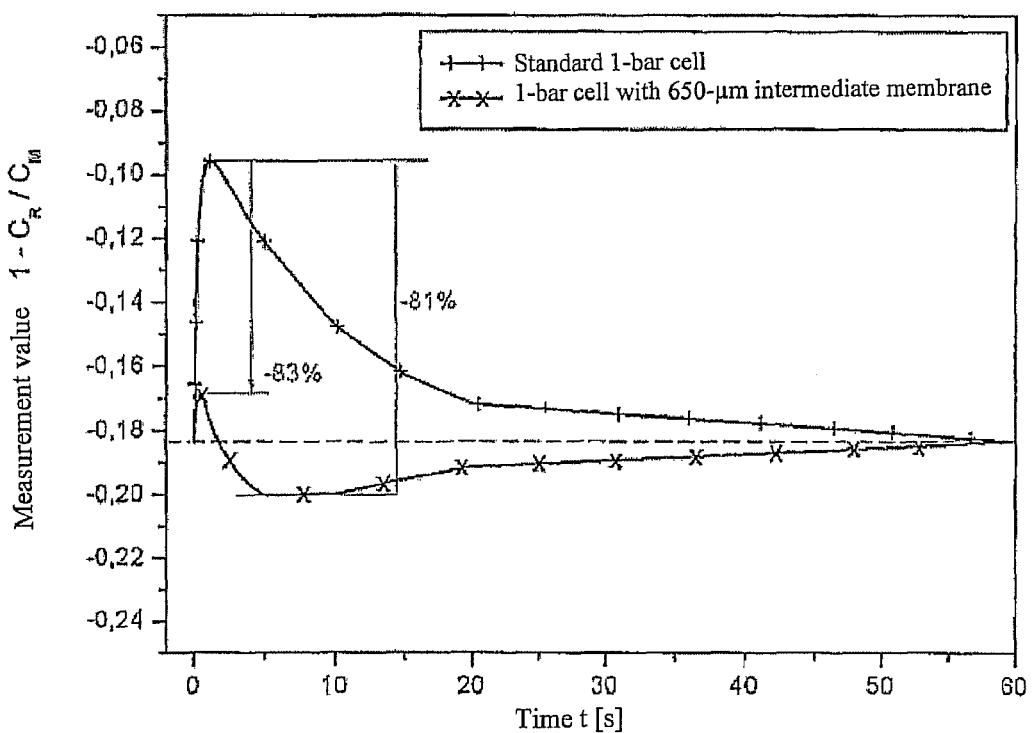
FIG. 9 is a comparison diagram of the change of the measured value with a measuring cell according to the state of the art and a measuring cell according to the invention.

The effects on the measured values M, which were obtained according to the formula $M=1-C_R/C_M$, delivered by the measuring cell 1 are represented in FIG. 9. As one can see from the characteristic lines in FIG. 9, a 650-µm intermediate membrane can considerably reduce the measured value variation in case of a thermal shock, so that a greater reliability of the measured values M delivered by the measuring cell 1 can be achieved.

As already indicated above, it is moreover also possible, by filling the clearance formed between the measurement membrane 5 and the base body 3 with a fluid which presents an increased heat conductivity in comparison to air, to achieve a much more rapid transfer of thermal effects to the intermediate membrane 7 and the base body 3, so that the processes represented in FIGS. 4-9 occur temporally more rapidly due to the more rapid heat transfer. The result is that the effects of the thermal shock are active only within a short time interval on the measured values M delivered by the measuring cell 1, and thus the risk of measurement errors is further reduced.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A measuring cell, said measuring cell comprising:
   (a) a base body;
   (b) a measurement membrane, said measurement membrane being arranged on said base body;
   (c) a measurement device, said measuring device further comprising:
      (i) a first measuring element, wherein said first measuring element is arranged on said measurement membrane; and
      (ii) a second measuring element; and
   (d) an intermediate membrane on which said second measuring element is arranged, said intermediate membrane being arranged between said measurement membrane and said base body.

2. A measuring cell according to claim 1, wherein said first measuring element and said second measuring element are a set of measuring electrodes.

3. A measuring cell according to claim 2, wherein each of said set of measuring electrodes is designed as a flat metallization of identical size, and form a measuring capacitance $C_m$.

4. A measuring cell according to claim 3, wherein each of said set of measuring electrodes is arranged centrally and present a radius (r) of 4-7 mm.

5. A measuring cell according to claim 3, wherein each of said set of measuring electrodes has a thickness (a) of 1-10 µm.

6. A measuring cell according to claim 4, said measuring cell further comprising a plurality of reference electrodes having an annular shape.

7. A measuring cell according to claim 1, wherein one or more additional measuring elements are provided on said intermediate membrane and on said base body.

8. A measuring cell according to claim 1, wherein said intermediate membrane further comprises one or more recesses.

9. A measuring cell according to claim 1, wherein a thickness (z) of said intermediate membrane is between 100% and 150% of a thickness (m) of said measurement membrane.

10. A measuring cell according to claim 1, said measurement cell further comprising a solder ring, and wherein said solder ring is arranged between said measurement membrane and said intermediate membrane.

11. A measuring cell according to claim 10, wherein the thickness of said solder ring is selected from a group comprising:
(a) a thickness of 2-5 mm; and
(b) a thickness of 10-20 μm.

12. A measuring cell according to claim 1, wherein a clearance between said measurement membrane and said base body is filled with a fluid which presents a thermal conductivity which is increased compared to air.

13. A measuring cell according to claim 12, said measuring cell further comprising a pressure compensation device.

14. A measuring cell, said measuring cell comprising:
(a) a base body;
(b) an intermediate membrane, said intermediate membrane being secured to said base body by a first solder ring;
(c) a measurement membrane, said measurement membrane being layered on said intermediate membrane and secured thereon by a second solder ring;
(d) a set of one or more measuring electrodes arranged on said measurement membrane;
(e) a set of one or more measuring electrodes arranged on said intermediate membrane; and
(f) a measurement device;
wherein said measurement membrane is directed outward and undergoes deformation with respect to said intermediate membrane as well as said base body, said deformation causing the measuring capacitance formed by said measuring electrodes to change according to the pressure applied.

15. A measuring cell according to claim 14, wherein the thickness of said solder ring is selected from a group comprising:
(a) a thickness of 2-5 mm; and
(b) a thickness of 10-20 μm.

16. A measuring cell according to claim 14, wherein a clearance between said measurement membrane and said base body is filled with a fluid which presents a thermal conductivity which is increased compared to air.

17. A measuring cell according to claim 16, said measuring cell further comprising a pressure compensation device.

18. A measuring cell according to claim 14, wherein said measuring cell further comprises a set of one or more ring-shaped reference electrodes, said each of said ring-shaped reference electrodes corresponding to each of said one or more measuring electrodes.

19. A method for measuring a pressure state, said method comprising the steps of:
(a) introducing a pressure change to a measurement cell wherein said measurement cell comprises:
(i) a base body;
(ii) an intermediate membrane, said intermediate membrane being secured to said base body by a first solder ring;
(iii) a measurement membrane, said measurement membrane being layered on said intermediate membrane and secured thereon by a second solder ring;
(iv) a set of one or more measuring electrodes arranged on said measurement membrane;
(v) a set of one or more measuring electrodes arranged on said intermediate membrane; and
(vi) a measurement device;
wherein said measurement membrane is directed outward and undergoes deformation with respect to said intermediate membrane as well as said base body, said deformation causing the measuring capacitance formed by said measuring electrodes to change according to the pressure applied;
(b) detecting said pressure change via detecting means; and
(c) measuring, via said measuring device, a magnitude of said pressure change.

20. The method of claim 19, said method further comprising the step of forming a capacitance by adding a set of one or more ring-shaped reference electrodes, said each of said ring-shaped reference electrodes corresponding to each of said one or more measuring electrodes.

* * * * *